United States Patent
Mendo Mateo et al.

(10) Patent No.: US 10,390,253 B2
(45) Date of Patent: Aug. 20, 2019

(54) NETWORK NODE AND A METHOD PERFORMED THEREBY FOR CONGESTION CONTROL OF A RADIO BASE STATION

(71) Applicant: Telefonaktiebolaget LM Ericsson (publ), Stockholm (SE)

(72) Inventors: Adriano Mendo Mateo, Malaga (ES); Salvador Luna Ramírez, Malaga (ES); Salvador Pedraza Moreno, Malaga (ES); Matías Toril Genovés, Malaga (ES); Ana Belen Vallejo Mora, Malaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 15/505,742

(22) PCT Filed: Sep. 2, 2014

(86) PCT No.: PCT/SE2014/051006
§ 371 (c)(1),
(2) Date: Feb. 22, 2017

(87) PCT Pub. No.: WO2016/036286
PCT Pub. Date: Mar. 10, 2016

(65) Prior Publication Data
US 2017/0272970 A1    Sep. 21, 2017

(51) Int. Cl.
*H04W 28/02*    (2009.01)
*H04L 12/801*    (2013.01)
(Continued)

(52) U.S. Cl.
CPC ....... *H04W 28/0205* (2013.01); *H04L 47/127* (2013.01); *H04L 63/10* (2013.01);
(Continued)

(58) Field of Classification Search
CPC . H04W 28/0205; H04W 16/10; H04W 16/18; H04W 28/0236; H04L 47/127; H04L 63/10
See application file for complete search history.

(56) References Cited

U.S. PATENT DOCUMENTS

| 4,435,840 A | 3/1984 | Kojima et al. |
| 2012/0213092 A1 | 8/2012 | Sun et al. |
| 2014/0073317 A1* | 3/2014 | Zhou ................ H04W 28/0205 455/424 |

FOREIGN PATENT DOCUMENTS

| WO | 20140118692 | 8/2002 |
| WO | 20090131522 | 10/2009 |

(Continued)

OTHER PUBLICATIONS

3GPP TS 36.213 v12.2.0, 3rd Generation Partnership Project; Title: "Technical Specification Group Radio Access Network Evolved Universal Terrestrial Radio Access (E-UTRA) Physical layer procedures," Release 12, Location and Date: Valbonne, France, Jun. 2014 consisting of 207-pages.

(Continued)

*Primary Examiner* — Hashim S Bhatti
(74) *Attorney, Agent, or Firm* — Sage Patent Group

(57) ABSTRACT

A network node and a method performed by the network node for congestion control in a Radio Base Station, RBS, are provided. The method comprises determining that the RBS is congested. The method further comprises determining an interference level in a neighboring RBS caused by wireless devices currently being served by the RBS, or determining a level of inter-cell coupling between the RBS and the neighboring RBS. Still further, method comprises increasing a value of an average received signal level target, $P_0$, for wireless devices currently being served by the RBS if the RBS is congested, if the determined interference level (Continued)

in the neighboring RBS is below an interference threshold or if the level of inter-cell coupling is below a coupling threshold.

18 Claims, 8 Drawing Sheets

(51) Int. Cl.
  *H04L 29/06* (2006.01)
  *H04W 16/10* (2009.01)
  *H04W 16/18* (2009.01)
(52) U.S. Cl.
  CPC ........... *H04W 16/10* (2013.01); *H04W 16/18* (2013.01); *H04W 28/0236* (2013.01)

(56) References Cited

FOREIGN PATENT DOCUMENTS

| WO | 20130074682 | 5/2013 |
|----|----|----|
| WO | WO 2014007691 A1 | 1/2014 |
| WO | 20140042569 | 3/2014 |
| WO | 20140081371 | 5/2014 |

OTHER PUBLICATIONS

International Search Report and Written Opinion dated Apr. 2, 2015 for International Application Serial No: PCT/SE2014/051006, International Filing Date—Sep. 2, 2014 consisting of 13-pages.
M.D. Anton, et al., Title: "An Adaptive Method to Learn the Compatibility Matrix for Microcellular Systems," Published In: IEEE 44th Vehicular Technology Conference, Jun. 8-10, 1994 consisting of 5-pages.
D.J.Y. Lee, Ce Xu, "Mechanical Antenna Downtilt and its Impact on System Design", IEEE 47th Vehicular Technology Conference, vol. 2:447-451, ISSN 1090-3038, May 4-7, 1997 consisting of 5-pages.
English Translation of A.B. Vallejo-Mora, et al., Title: "Estimación del acoplamiento entre celdas en el enlace ascendente en redes LTE," Sep. 2013 consisting of 6-pages.
Kuurne A.M., Title: "On GSM Mobile Measurement Based Interference Matrix Generation," Published In: VTC Spring 2002, IEEE 55th Vehicular Technology Conference, vol. 4:1965-1969, May 6-9, 2002 consisting of 5-pages.
J. Karlsson and B. Eklundh, Title: "A Cellular Mobile Telephone System with Load Sharing—an Enhancement of Directed Retry," Published In: IEEE Transactions on Communications, vol. 37(5):530-535, Aug. 6, 2002 consisting of 6-pages.
Weimin Xiao, et al., Title: "Uplink Power Control, Interference Coordination and Resource Allocation for 3GPP E-UTRA," Published In: VTC 2006-Fall, 2006 IEEE 64th Vehicular Technology Conference, Sep. 25-28, 2006 consisting of 5-pages.
Anil M. Rao, Title: "Reverse Link Power Control for Managing Inter-Cell Interference in Orthogonal Multiple Access Systems," 2007 IEEE 66th Vehicular Technology Conference, pp. 1837-1841, Sep. 30-Oct. 3. 2007 consisting of 5-pages.
3GPP TSG RAN WG1 #50bis, Meeting R1-074349, Title: "Overload Indicator Handling for LTE," Agenda Item: 6.4.3, Inter-cell Interference Coordination, Source: Nokia Siemens Networks, Nokia, Document for Discussion, Conference Locaiton and Date: Shanghai, China, Oct. 8-12, 2007 consisting of 6-pages.
Castellanos C.U., et al., Title: "Performance of Uplink Fractional Power Control in UTRAN LTE," Published In: VTC Spring 2008—IEEE Vehicular Technology Conference, (2517-2521), May 11-14, 2008 consisting of 5-pages.
Castellanos C.U., et al., Title: "Uplink Interference Control in UTRAN LTE Based on the Overload Indicator," Published In: VTC 2008-Fall, IEEE 68th Vehicular Technology Conference, (pp. 1-5), Sep. 21, 2008 consisting of 5-pages.
Bilal Muhammad and Abbas Mohammed, Title: "Performance Evaluation of Uplink Closed Loop Power Control for LTE System," Fall (VTC 2009-Fall, 2009 IEEE 70th Vehicular Technology Conference, Sep. 20-23, 2009 consisting of 5-pages.
Suh, C. et al., Title: "Tradeoff Power Control for Cellular Systems," Published In: GLOBECOM 2009. Global Telecommunications Conference, (pp. 1-6). Nov. 30-Dec. 4, 2009 consisting of 6-pages.
Bilal Muhammad and Abbas Mohammed, Title: "Uplink Closed Loop Power Control for LTE System," 2010 6th International Conference on Emerging Technologies (ICET), Oct. 18-19, 2010 consisting of 6-pages.
Mariana Dirani and Zwi Altman, Title: "Self-Organizing Networks in Next Generation Radio Access Networks: Application to Fractional Power Control," Computer Networks 55(2): 431-438, Feb. 1, 2011 consisting of 8-pages.
Sen Xu, et al., Title: "Coverage and Capacity Optimization in LTE Network Based on Non-Cooperative Games," The Journal of China Universities of Posts and Telecommunications, vol. 19(4):14-21, Aug. 1, 2012 consisting of 9-pages.
Papaoulakis, N., Nikitopoulos, D., & Kyriazakos, S., Title: "Practical Radio Resource Management Techniques for Increased Mobile Network Performance," Published In: 12th IST Mobile and Wireless Communications Summit, Jun. 2013, consisting of 5-pages.
A.B. Vallejo-Mora, et al., Title: "Estimate of the Coupling between Cells in the Link Ascending in Networks LTE," Sep. 2013 consisting of 10-pages.
Supplementary European Search Report—EP 14901270.0—Mar. 6, 2018—pp. 8.

* cited by examiner

NETWORK NODE AND A METHOD PERFORMED THEREBY FOR CONGESTION CONTROL OF A RADIO BASE STATION

CROSS-REFERENCE TO RELATED APPLICATIONS

This application is a submission under 35 U.S.C. § 371 for U.S. National Stage Patent Application of International Application Number: PCT/SE2014/051006, filed Sep. 2, 2014 and entitled "NETWORK NODE AND A METHOD PERFORMED THEREBY FOR CONGESTION CONTROL OF A RADIO BASE STATION," the entirety of which is incorporated herein by reference.

TECHNICAL FIELD

The present disclosure relates to wireless communication and in particular to congestion control of a radio base station of a wireless communication network.

BACKGROUND

In a wireless communication network, users having wireless communication devices, such as for example User Equipments, UEs, mobile telephones, laptops, Personal Digital Assistance, PDA, devices may move around within a coverage area of the wireless communication network. As the coverage area of the wireless communication network comprises a plurality of RBSs, each having respective coverage areas, generally referred to as cells, the wireless communication network comprises a plurality of size-limited cells. When users of wireless devices move around, they typically go from one cell to another. The RBS typically has a limited amount of resources, e.g. with regards to radio resources, such that the RBS may be more or less loaded with traffic generated by the wireless devices. Users may be travelling in groups, e.g. on a bus or a train, at a relatively high speed, wherein the conditions for an RBS may change rapidly, e.g. a train having a plurality of passengers using their individual wireless devices entering or leaving the cell of the RBS.

Different wireless technologies, such as for example Long Term Evolution, LTE, Universal Mobile Telecommunications System, UMTS, or Global System for Mobile Communications, GSM, may have different methods for dealing with situations where an RBS becomes heavily loaded or experiences high interference.

In LTE, UpLink Power Control, ULPC, is used to adjust the power transmitted by the terminal to adapt to: a) radio propagation channel conditions, including pathloss, shadowing and fast fading, and b) interference from other users served by surrounding cells. Thus, network performance is improved in terms of retainability (i.e. dropped connection rate) and minimum/average/peak user throughput.

Third Generation Partnership Project, 3GPP, standards specify the ULPC scheme for Physical Uplink Shared Channel, PUSCH, in LTE. Such a scheme is based on the combination of two mechanisms, namely open-loop and closed-loop operation. The basic open-loop operating point is defined as $$P_{TX_{open-loop}} = P_0 + \alpha \cdot PL \left[\frac{dBm}{PRB}\right], \quad (1)$$

where $P_{TX_{open-loop}}$ is the UE transmit power in a single Physical Resource Block (PRB) whose objective is to compensate for slow channel variations. $P_0$ defines the average received signal level target for all UEs in a cell, PL are the propagation losses and $\alpha$ is the channel pathloss compensation factor. In parallel, the closed-loop operation is added to adapt UE to changes in the inter-cell interference, and/or measurement and power amplifier errors. The closed-loop operation is defined as $$\text{Dynamic offset}_{closed-loop} = \Delta_{TF} + f(\Delta_{TPC})[dB], \quad (2)$$

where Dynamic offset$_{closed-loop}$ is an additional power term to add to $P_{TX_{open-loop}}$. Its value depends on the selected modulation scheme ($\Delta_{TF}$) and power-control commands sent by the eNodeB ($\Delta_{TPC}$) according to a function $f( )$.

Thus, the power control scheme for PUSCH including open-loop and closed-loop mechanisms calculates the UE transmit power ($P_{TX}$) in each subframe as $$P_{TX} = \min\left\{P_{tx_{max}}, \underbrace{P_0 + \alpha \cdot PL}_{\substack{\text{basic open-loop}\\\text{operating point}}} + \underbrace{\Delta_{TF} + f(\Delta_{TPC})}_{\text{dynamic offset}} + \underbrace{10 \cdot \log_{10} M_{PUSCH}}_{\text{bandwidth factor}}\right\}[dBm], \quad (3)$$

where $P_{tx_{max}}$ is the maximum UE transmit power and $M_{PUSCH}$ is the number of allocated PRBs to the wireless device.

Several self-tuning algorithms have been proposed for the ULPC scheme, mainly by changing $P_0$ and/or $\alpha$ parameters. For example, analysis of basic open-loop fractional power control (i.e. an initial setting for ULPC), or studies of close-loop operation. In such solutions, the $\alpha$ parameter is changed in order to mitigate interference and achieve a trade-off between overall network spectral efficiency and cell-edge bit rates. More refined power control schemes for LTE consider interference and load data. A suboptimal parameter configuration is another example for interference and noise limited macro-cellular scenarios, where $P_0$ and $\alpha$ modifications are carried out to evaluate their impact on the Signal-to-Interference plus Noise Ratio, SINR, and interference distributions. Therefore, this solution uses system-level simulations to evaluate network sensitivity to changes in ULPC parameters in the standardised power control. A more sophisticated planning method may be obtained by the application of classical optimisation techniques to ULPC in a single cell, being average and cell throughput the figures of merit based on the target SINR at the desired radio base station, RBS. This method may be extended to a scenario with multiple cells using $P_0$ adjustments, where ULPC is formulated as a non-cooperative game model and a heuristic iterative optimisation algorithm is presented (network management system is informed of uplink power settings of each cell, and there is an exchange of power and interference information among neighbour cells). Another solution is to use an overload indicator to dynamically adjust $P_0$ parameter, and thus control the overall interference in the network. Another algorithm for ULPC that varies $\alpha$ parameter may be based on fuzzy-reinforcement learning techniques.

Congestion is one of the key issues in live cellular networks. Cellular traffic is unevenly distributed in time and space, which makes network dimensioning a very challenging task. As a result, some cells or RBSs in the real network may be congested, while others may be underutilised. Fast fluctuations in traffic demand are dealt with through Radio Resource Management, RRM, procedures, such as dynamic load sharing, which takes advantage of overlapping between neighbour RBSs or cells by redirecting calls to cells with available spare capacity. In contrast, localised and persistent congestion problems may solved in long term by planning strategies, such as adding new carriers or sites, or splitting cells. In the short term, the adaptation of cell service areas remains the only solution for those RBSs or cells that cannot be upgraded quickly or simply do not justify the deployment of additional resources. To adjust cell service areas, several techniques have been proposed. Some modify physical parameters in the base station, such as base station transmit power or antenna pattern. Others modify parameters in RRM processes, such as Cell (Re)Selection, CRS, and HandOver, HO. As tuning CRS parameters is only effective during call set-up, the optimisation of HO parameters, such as HO margins, is the preferred option.

The methods known in the art for adjusting ULPC settings are focused on improving user connection quality and/or reducing interference problems, but not on solving congestion problems. In an example, an Overload Indicator OI, which is exchanged between RBS, is used for inter-cell interference coordination, ICIC, when the Interference over Thermal, IoT, level is higher than a threshold. Each RBS or cell counts the number of OI messages received from its neighbours during a certain time window, and dynamically adjusts $P_0$. Therefore, this indicator reports to a cell receiving a lot of OI messages that its neighbouring RBSs or cells have much interference due to high load. When this happens, $P_0$ is decreased to reduce the interference. Although this mechanism detects overload, its aim is to avoid interference problems, but not to relieve congestion. In fact, the $P_0$ parameter is reduced in surrounding RBSs or cells, and not in the RBS or cell with OI.

To solve congestion problems, methods in prior art rely on the overlapping between adjacent RBSs/cells. Thus, users, i.e. wireless devices, in a congested RBS/cell are re-allocated to surrounding RBSs/cells with spare capacity by changing antenna tilts or handover margins. Down-tilting the antenna of a congested RBS/cell may cause coverage holes in that cell. This may only be avoided if antenna changes are coordinated between neighbour sites, which are a complex mechanism. As these actions might affect coverage, they are seldom used. Likewise, decreasing HO margins in a congested cell has a negative impact on signal quality, as users, i.e. wireless devices, are not served by the RBS/cell providing the best signal level. Our first field trials have shown that the connection quality degradation produced by HO-based load balancing is dramatic in live LTE networks, where a full frequency reuse is used. The result is an unacceptable impairment in retainability.

Moreover, the congestion relief effect achieved by the previous techniques is large only if: a) the overlapping area between adjacent cells is large, and b) the traffic load pattern is uncorrelated between the cell sending traffic (i.e. congested RBS/cell) and the cell capturing traffic (i.e. empty cell). Both conditions must be fulfilled for an effective load balancing mechanism. None of these conditions is satisfied in indoor cells in urban hot-spots, especially in the underground. In this scenario, cell overlapping area is small, when compared to the cell service area, due to good isolation between cells. More importantly, the traffic load pattern between neighbour cells is fully correlated, because of user mobility in groups. As users having wireless devices travel together from one RBS to the next, users move away from the serving RBS, causing that cell load increases, as a result of using less effective modulation schemes owing to decreasing signal level. At the same time, users entering the new cell are connected very far from the new cell, producing an increase in cell load. Such a simultaneous load increase in both cells leads to an increase in received interference levels in both cells, which increases cell load even more. As a result, both accessibility, retainability and user throughput degrade significantly. Retainability figures (i.e. dropped connection rate) may grow up to 75% in these cells. Note that this situation cannot be solved by dynamic load sharing algorithms based on temporarily changing HO margins, as cell overlapping proves to be not enough.

SUMMARY

The object is to obviate at least some of the problems outlined above. In particular, it is an object to provide a network node and a method performed thereby for congestion control in a Radio Base Station, RBS. These objects and others may be obtained by providing a network node and a method performed by a network node according to the independent claims attached below.

According to an aspect, a method performed by a network node for congestion control in an RBS is provided. The method comprises determining that the RBS is congested. The method further comprises determining an interference level in a neighbouring RBS caused by wireless devices currently being served by the RBS, or determining a level of inter-cell coupling between the RBS and the neighbouring RBS. Still further, method comprises increasing a value of an average received signal level target, $P_0$, for wireless devices currently being served by the RBS if the RBS is congested, if the determined interference level in the neighbouring RBS is below an interference threshold or if the level of inter-cell coupling is below a coupling threshold.

According to an aspect, a network node for congestion control in an RBS is provided. The network node is configured to determine that the RBS is congested; to determine an interference level in a neighbouring RBS caused by wireless devices currently being served by the RBS, or to determine a level of inter-cell coupling between the RBS and the neighbouring RBS. The network node further is configured to increase a value of an average received signal level target, $P_0$, for wireless devices currently being served by the RBS if the RBS is congested, if the determined interference level in the neighbouring RBS is below an interference threshold or if the level of inter-cell coupling is below a coupling threshold.

The network node and the method performed by the network node may have several advantages. One possible advantage is that congestion problems may be solved in situations where all other congestion relief methods (e.g. HO-based or tilt-based load balancing) fail to work, e.g. indoor cells deployed for the underground, where limited cell overlapping exists and load patterns are highly correlated between adjacent cells. Another possible advantage is that the method may detect isolated cells, which are decoupled (from the interference point of view) from other cells in the network. Thus, increasing $P_0$ does not have a significant impact on interference in surrounding cells. Still a possible advantage is that the method may be triggered based on statistical cell measurements, which may be collected by RBSs. The changes of $P_0$ is reliable provided that a sufficiently long Report Output Period is selected for measurements (e.g. 1-2 days). Yet a further possible advantage is that the method is based on comparing key performance measurements against certain thresholds and it increases $P_0$ by a certain value (linear operation) when congestion is detected, thereby the computational load is low. A possible advantage is that the method does not need external parameters, wherein internal parameters, such as thresholds, may be set based on field trials, thus making the method simple and easy to use. Further, an aim of the method is to detect congested cells that are isolated and increase their $P_0$ to reduce their traffic load. It is a straightforward method that is very easy to understand by network operators. Another possible advantage is that the method is applicable to heterogeneous (e.g. macro-indoor), multi-vendor and multi-RAT (Radio Access Technology) scenarios, since all the required information is available in all these cases.

BRIEF DESCRIPTION OF DRAWINGS

Embodiments will now be described in more detail in relation to the accompanying drawings, in which.

DETAILED DESCRIPTION

Briefly described, a network node and a method performed by the network node are provided for congestion control of an RBS. Different factors may be taken into account in addition to the RBS being congested before taking measures what to do in order to relief the congestion of the RBS.

Figure 1A:
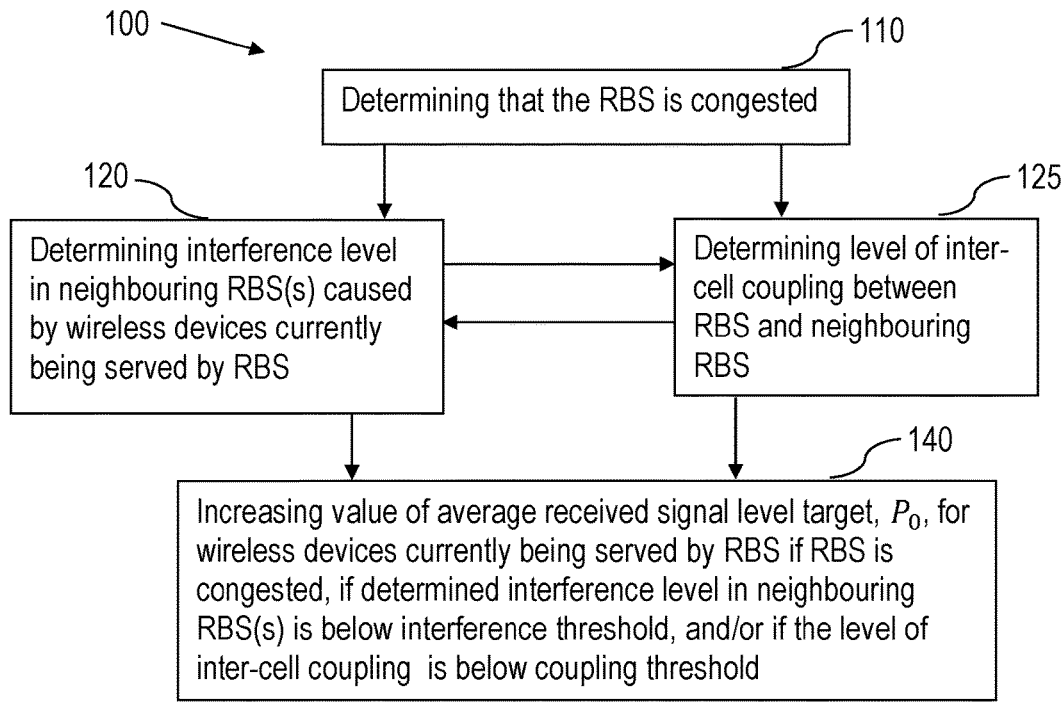
FIG. 1a is a flowchart of a method performed by a network node for congestion control in a Radio Base Station, RBS, according to an exemplifying embodiment.

Embodiments herein relates to a method performed by a network node for congestion control of an RBS. Embodiments of such a method will now be described with reference to FIG. 1a. FIG. 1a illustrates the method comprising determining 110 that the RBS is congested. The method further comprises determining 120 an interference level in a neighbouring RBS caused by wireless devices currently being served by the RBS, or determining 125 a level of inter-cell coupling between the RBS and the neighbouring RBS. Still further, method comprises increasing 140 a value of an average received signal level target, $P_0$, for wireless devices currently being served by the RBS if the RBS is congested, if the determined interference level in the neighbouring RBS is below an interference threshold or if the level of inter-cell coupling is below a coupling threshold.

In a wireless communication network, or system, users of wireless devices typically move about as described above. When users of wireless devices move around, they typically go from one cell to another. The RBS typically has a limited amount of resources, e.g. with regards to radio resources, such that the RBS may be more or less loaded with traffic generated by the wireless devices.

If an RBS becomes congested, i.e. the network node determines that the RBS is congested 110, meaning that there are a relatively large amount of UEs within the cell being served by the RBS of the cell thereby making use of all or a majority of the radio resources, the network may decide to take some actions in order to somewhat relieve the RBS of the congestion, e.g. the heavy load the RBS is experiencing. Instead of simply handing over UEs being close to the cell border of neighbouring cells to the respective RBSs of the neighbouring cells, the network node determines 120 the interference level in the neighbouring RBS caused by wireless devices currently being served by the RBS, or determines 125 the level of inter-cell coupling between the RBS and the neighbouring RBS. It shall be pointed out that it is not an exclusive or, the RBS may determine both the interference level in the neighbouring RBS caused by wireless devices currently being served by the RBS and the level of inter-cell coupling between the RBS and the neighbouring RBS.

There are difference ways to determine the interference level in the neighbouring RBS caused by wireless devices currently being served by the RBS. An example is receiving a value of a parameter called SinrTargetSamples. The parameter SinrTargetSamples is cell-level indicator showing percentage of uplink data transmitted with a $SINR_{UL} > SINR_{UL,min}$ (i.e. acceptable Signal to Interference and Noise Ratio, SINR, value, since $SINR_{UL,min}$ is a minimum value) in neighbouring cell or RBS for a period under analysis. $SINR_{min}$ is an internal constant that is assumed to be fixed, e.g. to −3 dB, as suggested in the literature for the Physical Uplink Shared Channel, PUSCH. A threshold value is defined for the SinrTargetSamples parameter, $TH_4$, referred to as the interference threshold. A low ratio of acceptable SINR samples in the neighbouring cell or RBS is due to interference problems (and not due to coverage problems) when SinrTargetSamples(j)<$TH_4$ in the neighbouring cell or RBS j. This indicator may be exchanged between neighbouring RBSs or transmitted to e.g. node implementing an Operations Support System, OSS, or a node implementing a Network Management System, NMS, as will be explained in more detail below.

There are difference ways to determine the level of inter-cell coupling between the RBS and the neighbouring RBS. An example is a parameter called CouplingInterCell indicators, which is an adjacency-based indicator showing the percentage of average uplink interference in the neighbouring cell or RBS originated by users in the cell of the RBS for the period under analysis. A threshold value may be defined for this parameter, $TH_5$, referred to as coupling threshold. In this disclosure, it is considered that neighbouring cell or RBS is not significantly interfered by the RBS for which the congestion control is being performed when CouplingInterCell(i,j)<$TH_5$.

Values of CouplingInterCell(i,j) may be obtained from calculations in network planning tools, from network measurements, or by detecting correlation between load and interference patterns. These computations are out of the scope of this disclosure. This indicator may be computed e.g. in the OSS or in the RBS, for which the required network performance measurements have to be exchanged between RBSs. i represents the RBS for which congestion control is performed and j represents neighbouring RBS j.

Then, the network node increases 140 the value of the average received signal level target, $P_0$, for wireless devices currently being served by the RBS if the RBS is congested, if the determined interference level in the neighbouring RBS is below the interference threshold or if the level of inter-cell coupling is below the coupling threshold.

A reason for the determined interference level in the neighbouring RBS being below the interference threshold or if the level of inter-cell coupling being below the coupling threshold in order for the network node to increase the value of the average received signal level target, $P_0$, for wireless devices currently being served by the RBS, is that such an increase may affect the neighbouring RBS negatively. If the interference level in the neighbouring RBS is above the threshold, it means that UE(s) served by the RBS is already causing relatively severe interference in the neighbouring RBS, wherein an increase of $P_0$ would increase the interference caused by wireless devices currently being served by the RBS in the neighbouring RBS. If the level of inter-cell coupling is above the threshold, it means that the RBS and the neighbouring RBS have overlapping cells or coverage areas. This may lead to that an increase of $P_0$ would increase the interference caused by wireless devices currently being served by the RBS in the neighbouring RBS.

It shall be pointed out that the network node may perform the actions described above for each and every neighbouring RBS or cell of the RBS in question.

The method performed by the network node may have several advantages. One possible advantage is that congestion problems may be solved in situations where all other congestion relief methods (e.g. HO-based or tilt-based load balancing) fail to work, e.g. indoor cells deployed for the underground, where limited cell overlapping exists and load patterns are highly correlated between adjacent cells. Another possible advantage is that the method may detect isolated cells, which are decoupled (from the interference point of view) from other cells in the network. Thus, increasing $P_0$ does not have a significant impact on interference in surrounding cells. Still a possible advantage is that the method may be triggered based on statistical cell measurements, which may be collected by RBSs. The changes of $P_0$ is reliable provided that a sufficiently long Report Output Period is selected for measurements (e.g. 1-2 days). Yet a further possible advantage is that the method is based on comparing key performance measurements against certain thresholds and it increases $P_0$ by a certain value (linear operation) when congestion is detected, thereby the computational load is low. A possible advantage is that the method does not need external parameters, wherein internal parameters, such as thresholds, may be set based on field trials, thus making the method simple and easy to use. Further, an aim of the method is to detect congested cells that are isolated and increase their $P_0$ to reduce their traffic load. It is a straight-forward method that is very easy to understand by network operators. Another possible advantage is that the method is applicable to heterogeneous (e.g. macro-indoor), multi-vendor and multi-RAT (Radio Access Technology) scenarios, since all the required information is available in all these cases.

In an example, both the interference level in the neighbouring RBS caused by wireless devices currently being served by the RBS and the level of inter-cell coupling between the RBS and the neighbouring RBS are determined, wherein the average received signal level target, $P_0$, is increased, if the determined interference level in the neighbouring RBS is below the interference threshold and if the level of inter-cell coupling is below the coupling threshold.

In this example, since both the interference level in the neighbouring RBS caused by wireless devices currently being served by the RBS and the level of inter-cell coupling between the RBS and the neighbouring RBS are determined, both conditions must be fulfilled in order for the network node to increase $P_0$. The two characteristics are correlated. In case there is no inter-cell coupling between the RBS and the neighbouring RBS, it means that users in the RBS may not cause interference in the neighbouring RBS. However, the inter-cell coupling between the RBS and the neighbouring RBS may be high, but the UEs within the cell of the RBS may be distributed geographically in such a manner that they do not cause much interference in the neighbouring cell. However, since the UEs are likely to move about, an increase of $P_0$ may soon lead to interference in the neighbouring RBS. Further, it shall be pointed out that the RBS may have a plurality of neighbouring RBSs. Assuming that the inter-cell coupling between the RBS and some, or all, of the neighbouring RBSs is high, then an increase of $P_0$ may cause an increase of interference in at least a part of the neighbouring RBS having a high inter-cell coupling with the RBS being congested.

Figure 1B:
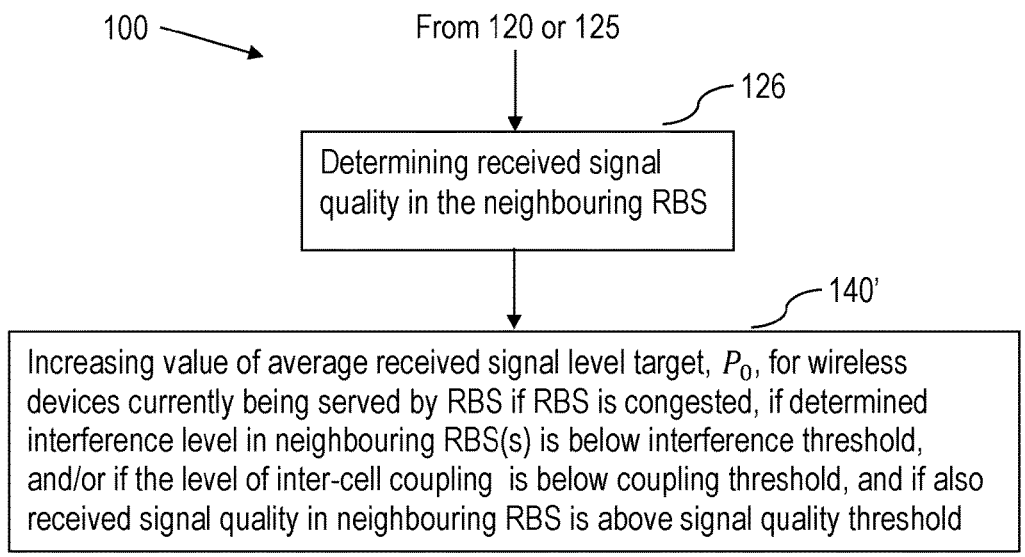
FIG. 1b is a flowchart of a method performed by a network node for congestion control in an RBS, according to yet an exemplifying embodiment.

The method may further comprise, as illustrated in FIG. 1b, determining 126 a received signal quality in the neighbouring RBS, wherein the average received signal level target, $P_0$, is increased, if also the received signal quality in the neighbouring RBS is above a signal quality threshold.

In addition to the previously described actions, or method steps, if the received signal quality in the neighbouring RBS is above the signal quality threshold, then an increase of $P_0$ may possible, or even likely, not likely cause an increased interference situation in the neighbouring RBS (or the cell of the neighbouring RBS) to such an extent that the received signal quality in the neighbouring RBS becomes unacceptable.

Consequently, should the received signal quality in the neighbouring RBS be below the signal quality threshold, this may serve as an indication that the received signal quality in the neighbouring cell is already relatively poor. Thus, even if the determined interference level in the neighbouring RBS is below the interference threshold and if the level of inter-cell coupling is below the coupling threshold, an increase in $P_0$ may still affect the received signal quality in the neighbouring RBS negatively and therefore, the network node does not increase $P_0$.

The network node may obtain the information regarding the received signal quality in the neighbouring RBS by the neighbouring performing measurements and then sending measurement reports to the network node.

Figure 1C:
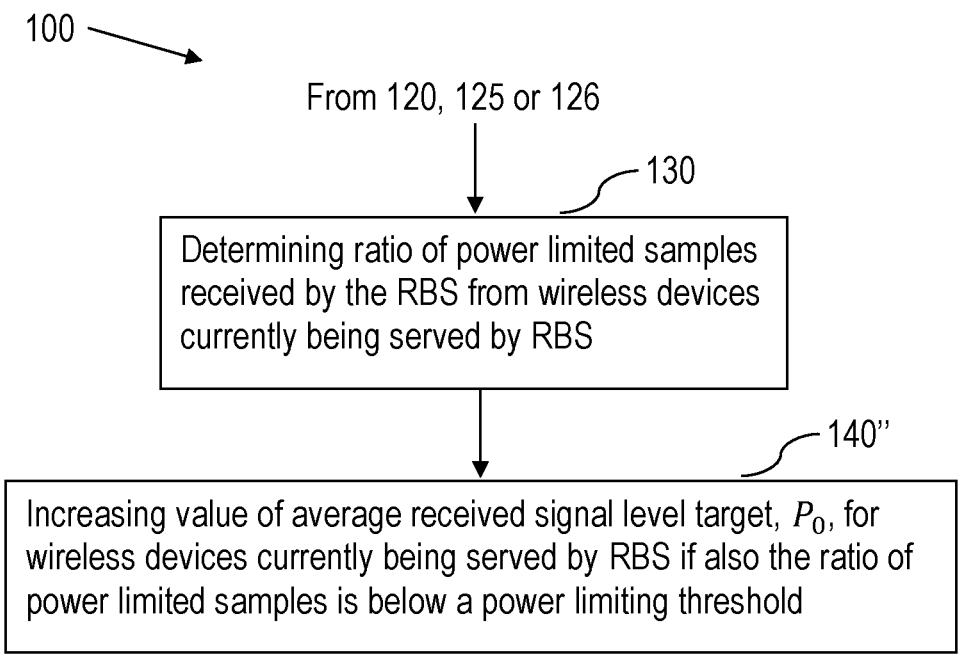
FIG. 1c is a flowchart of a method performed by a network node for congestion control in an RBS, according to still an exemplifying embodiment.
Figure 1D:
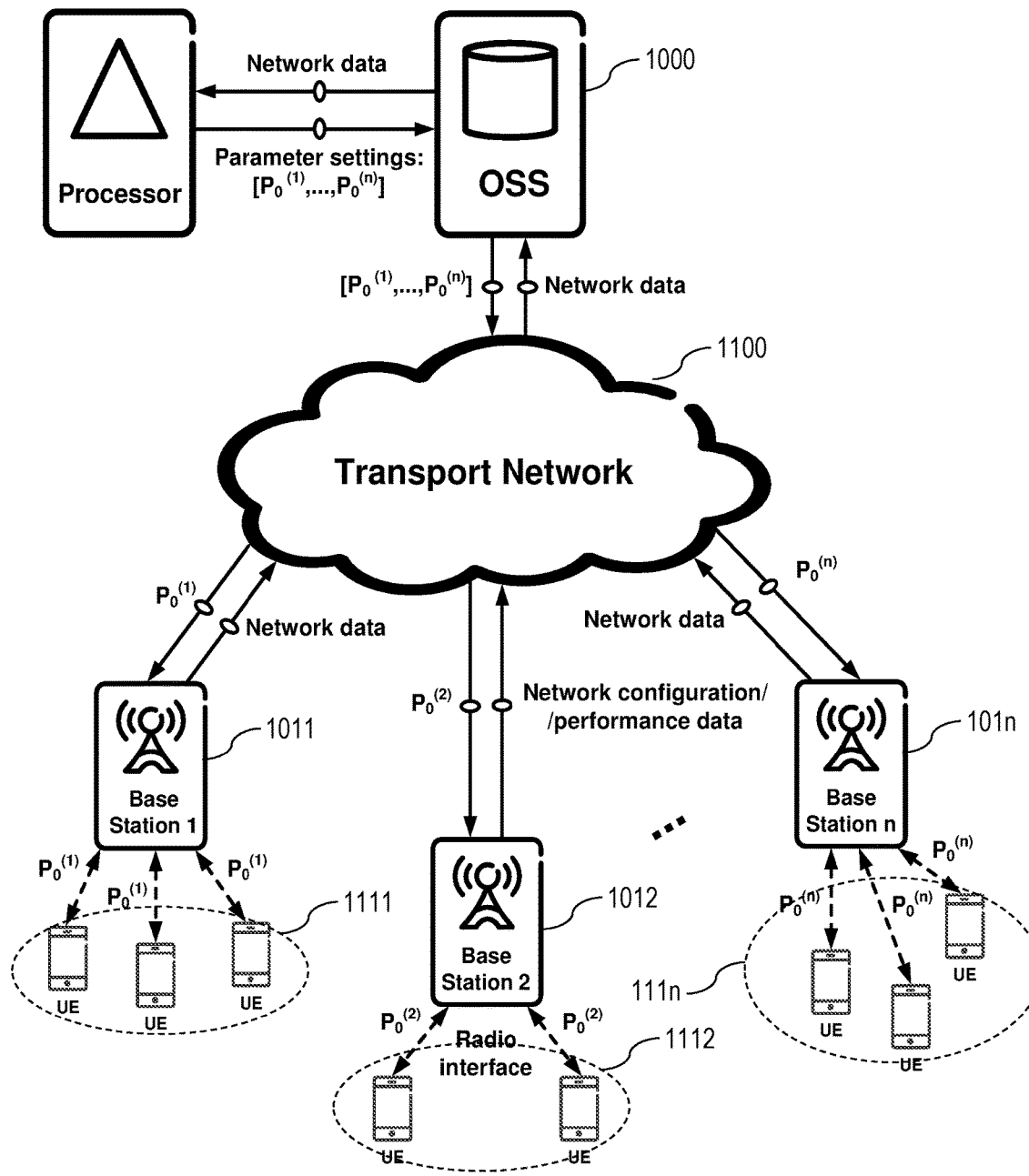
FIG. 1d is an exemplifying illustration of a network architecture in conjunction with a centralised solution.

The method may still further comprise, as illustrated in FIG. 1c, determining 130 a ratio of power limited samples received by the RBS from wireless devices currently being served by the RBS, wherein the average received signal level target, $P_0$, is increased, if also the ratio of power limited samples is below a power limiting threshold.

The ratio of power limited samples may be determined by a parameter, or indicator, referred to as PowerLimitedSamples(i), which may be expressed in %. It is a cell-level indicator showing percentage of uplink data transmissions from power-limited samples (i.e. $P_{TX}=P_{TX,max}$) compared to the total number of uplink data transmission samples for the period under analysis. A threshold value may be defined for this parameter, $TH_2$, referred to as the power limiting threshold, In this disclosure, an RBS i is said to contain few power-limited samples when PowerLimitedSamples(i) <$TH_2$.

In case of a high ratio of power limited samples, an increase of $P_0$ may not be effective because most of the wireless devices are already transmitting at maximum power. The term "sample" in the expression "power limited samples" refer to uplink data transmissions made by a certain set of wireless devices which corresponding transmission power figures is/are monitored (i.e. "sampled"), and which transmission power figures equates to the maximum transmission power. In other words, the transmission power utilised by a wireless device on an uplink transmission may be monitored/sampled, and the collected—monitored/sampled—transmission power figures (referred herein as "power limited samples") may be utilised as described in the embodiments herein.

Determining 110 that the RBS is congested may in an example comprise comparing a Congestion Indicator parameter against a congestion threshold, wherein the RBS is determined to be congested if the Congestion Indicator parameter is equal to or above the congestion threshold.

There may be several ways to determine that the RBS is congested. Merely for illustrative purposes, an example of congestion may be a level of available buffer space in relation to the total buffer space within the RBS; another example is a load level of one or more processors within the RBS.

The network node may determine that the RBS is congested by means of a parameter referred to as CongestionIndicator(i), which may be expressed in %, where (i) represents the RBS. Any cell-level indicator measuring traffic congestion in a cell may be used, e.g. Physical Resource Block, PRB, utilisation (average percentage of uplink PRB occupied in a cell for the period under analysis) or Call Blocking Ratio (blocked over accepted connections/calls). A threshold value may be defined for this parameter, $TH_1$, referred to as a congestion threshold. In this disclosure, an RBS i is said to be congested when CongestionIndicator(i) >$TH_1$, i.e. when the congestion indicator is above the congestion threshold.

In an example, determining 130 the ratio of power limited samples comprises determining a number of received transmissions, from wireless devices, having been transmitted at a limited transmission power, determining a total number of received transmission samples from wireless devices, and determining the ratio of power limited samples received by the RBS from wireless devices currently being served by the RBS by dividing the determined number of received transmissions, from wireless devices, having been transmitted at a limited transmission power by the determined total number of received transmission samples from wireless devices.

When a wireless device transmits data, packets, or signals (referred to as transmissions) to the RBS, the wireless device does so at a certain transmission power. Some transmissions may be done at so-called nominal transmission power and some transmissions may be done at limited transmission power. One wireless device may perform some transmissions at nominal transmission power, some transmissions at limited transmission power, or all its transmission at either nominal or limited transmission power. Since the RBS typically is serving a plurality of wireless device, all performing uplink transmissions, the RBS receives a total amount of uplink transmissions from the different wireless devices, also referred to as UEs, during a certain period of time. Out of all those received uplink transmissions, some are transmitted at nominal transmission power and some are transmitted at limited transmission power.

By dividing the number of received uplink transmissions having been transmitted at the limited transmission power by the determined total number of received uplink transmission samples, the network node obtains the ratio of power limited samples.

Determining 120 the interference level in the neighbouring RBS caused by wireless devices currently being served by the RBS may in an example comprise receiving a report from the neighbouring RBS indicating a percentage of average interference in the neighbouring RBS caused by wireless devices currently being served by the RBS, i.e. the RBS for which congestion control is being performed.

The neighbouring RBS, or neighbouring RBSs, generally perform different measurements in the uplink in order to evaluate the radio conditions in its cell or coverage area. Further, wireless devices being served by the neighbouring RBS may perform different measurements in the downlink that they then report to the neighbouring RBS, e.g. by sending measurement reports.

Based on these different measurements, either in uplink or downlink or both, the neighbouring RBS determines the interference level in the neighbouring RBS caused by wireless devices currently being served by the RBS. The neighbouring RBS may then send this information, e.g. in a report, to the network node.

In an example, increasing 140 $P_0$ is performed by adding a step value to the current $P_0$.

This means that there are different predefined values of $P_0$ that are used by the RBS. For example, a lowest value is defined for $P_0$ and also an incremental value, i.e. the step value, is defined, e.g. $\Delta P_0$, which is added to a current value of $P_0$ when $P_0$ is to be increased. $\Delta P_0$ may be computed in an Operations Support System, OSS, in a centralised solution, whereas, in a distributed solution, may be calculated in each RBS. The centralised and distributed solutions will be described in more detail below.

According to an embodiment, determining 120 an interference level in a neighbouring RBS caused by wireless devices currently being served by the RBS, is performed for every neighbouring RBS of the RBS for which congestion control is being performed.

As briefly mentioned above, the RBS, referred to as RBS(i), may have a plurality of neighbouring RBSs, referred to as RBS(j) where $1 \leq j \leq N$, where j is an integer and N is the total number of neighbouring RBSs. Thus, the method steps or actions described above with reference to RBS(i) being the RBS in question and RBS(j) being the neighbouring RBS are performed for every neighbouring RBS(j), where $1 \leq j \leq N$, where j is an integer and N is the total number of neighbouring RBSs.

In other words, the network node determines 110 that the RBS(i) is congested. The network node determines 120 an interference level in neighbouring RBS(j) caused by wireless devices currently being served by the RBS(i), or determines 125 a level of inter-cell coupling between the RBS(i) and the neighbouring RBS(j) for all neighbouring RBS where $1 \leq j \leq N$, where j is an integer and N is the total number of neighbouring RBSs. Still further, network node increases 140 the value of the average received signal level target, $P_0$, for wireless devices currently being served by the RBS if the RBS is congested, if the determined interference level in all the neighbouring RBS(j) is below the interference threshold or if the level of inter-cell coupling for all neighbouring RBS(j) is below the coupling threshold. Then the method continues as described above, which will not be repeated here in order to avoid unnecessary repetition.

Figure 1E:
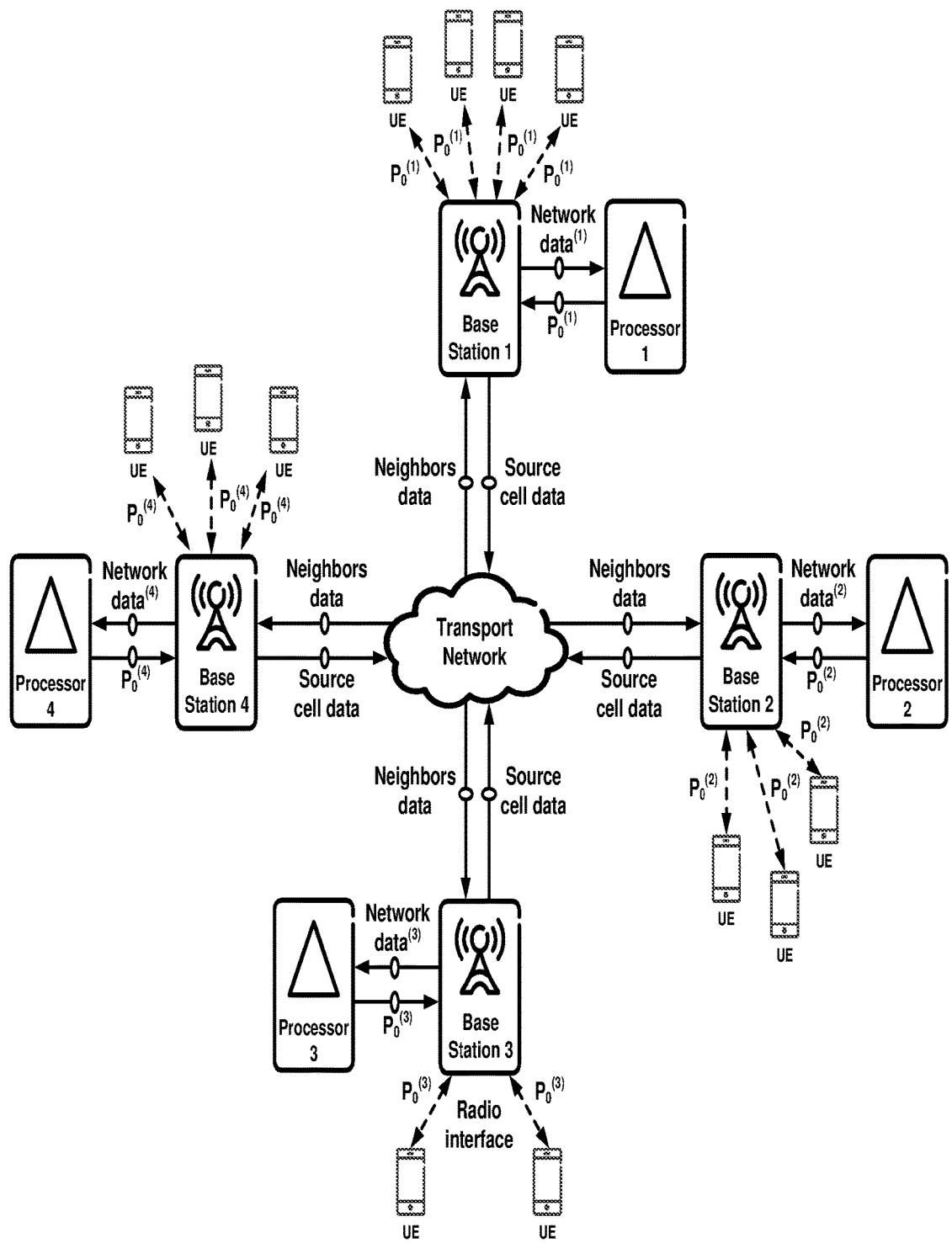
FIG. 1e is an exemplifying illustration of a network architecture in conjunction with a distributed solution.

In an example, illustrated in FIG. 1e, the network node is a node implementing an Operations Support System, OSS, or a node implementing a Network Management System, NMS.

The network node in this example can be said to comprise a centralised implementation of the network node. FIG. 1e illustrates an OSS 1000, which alternatively could be an NMS. The OSS 1000 may communicate with the RBSs 1011, 1012, . . . , 101n via a transport network 1100. The RBSs serve respective plurality of wireless devices 1111, 1112, . . . , 111n.

The network node may then perform congestion control for each and every RBS it communicates with via the transport network. Thus, the network node may obtain information from each and every RBS, the information pertaining to the different characteristics as described above, e.g. interference level in a neighbouring RBS(j) caused by wireless devices currently being served by the RBS(i), just to mention one.

In another example, the network node is the RBS for which congestion control is being performed.

In this example, the RBS(i) itself performs the method comprising the actions described above. RBS(i) may communicate with its neighbouring RBS(j), $1 \leq j \leq N$, where j is an integer and N is the total number of neighbouring RBSs, for example by means of an X2 interface in case the wireless communication network in which the RBSs are operating employs Long Term Evolution, LTE. Alternatively, the RBSs may communicate with each other by means of e.g. a Radio Network Controller, RNC, or a Base Station Controller, BSC.

In still a further example, the network node is a Radio Network Controller, RNC, or a Base Station Controller, BSC, controlling at least the RBS for which congestion control is being performed.

Depending on the type of wireless communication network, LTE, Universal Mobile Telecommunications System, UMTS, or GSM, Global System for Mobile Communications, the network architecture is somewhat different. In UMTS the RNC may control a plurality of RBSs, of which some may be neighbouring RBSs to other RBSs that the RNC is controlling. Thus the RNC may obtain the above described information and characteristics of the RBSs it is controlling and thereby increase (or decrease) $P_0$ as it sees fit according to the method described above. The RNC may then inform the RBSs in question which $P_0$ it is supposed to employ.

For GSM, the BSC may control a plurality of RBSs in the same or similar manner as for the RNC in UMTS. If the network node is the BSC, then the BSC may obtain the above described information and characteristics of the RBSs it is controlling and thereby increase (or decrease) $P_0$ as it sees fit according to the method described above. The BSC may then inform the RBSs in question which $P_0$ it is supposed to employ.

The method described above may achieve congestion relief in the Physical Uplink Shared Channel, PUSCH, of a congested RBS or cell by changing Uplink Power Control, ULPC, settings instead of diverting wireless devices to other cells. This may be critical when congestion occurs in an RBS or cell whose wireless devices cannot be served by any neighbour, either because the latter is also congested or there is no overlapping between them. When any of the previous situations is detected (i.e. congestion in many surrounding cells or congestion in an isolated cell), the method decreases RBS/cell load by increasing pzeroNominalPusch parameter ($P_0$) in the congested cell(s). The aim of increasing $P_0$ is to improve uplink signal quality in terms of SINR for users close to the RBS (i.e. non-power-limited users). The uplink SINR value determines the Modulation and Coding Scheme, MCS, selected for each transmission by Adaptive Modulation and Coding, AMC, mechanism in the RBS. The selected MCS is then sent to the wireless device in the Physical Downlink Control Channel, PDCCH. This MCS field determines the modulation scheme and code rate used by wireless device in PUSCH transmissions, so that the higher its value, the more effective the modulation and code used by the wireless device. Thus, any uplink SINR improvement is translated directly into higher MCSs used by the wireless device (unless restricted by higher layers). The use of more effective modulation schemes by the wireless device leads to a reduction in the number of used PRBs by the wireless device, and hence a congestion relief effect in the uplink.

To ensure adequate performance, the method may check, before modifying $P_0$ in an RBS or cell, if: a) the cell is isolated from surrounding or neighbouring RBSs or cells, so that the increase in $P_0$ does not cause interference problems in neighbouring RBSs or cells and, optionally, if b) the ratio of power-limited samples in the cell is small, so that changes in $P_0$ have a non-negligible impact on congestion performance indicators in the RBS or cell.

As describe above, there are two possible implementations for the proposed method: a centralised solution, located in the OSS/NMS, or a distributed solution, located in the RBS or RNC/BSC. An exemplifying centralised system architecture is illustrated in FIG. 1e. The base station collects network performance measurements for a certain reporting period and current network configuration data. Both configuration and performance data is sent to the OSS by means of a transport network. Such data is delivered to a processor, responsible for computing new $P_0$ settings on a cell basis. The resulting values of $P_0$ in each cell, $[P_0^{(1)}, \ldots, P_0^{(n)}]$, are sent back to the OSS and later downloaded to the base stations. The new $P_0$ parameter value is sent to the user equipment (UE) by a signalling channel. As a result of the process, the user modifies UL transmit power, which has a direct impact on experienced connection quality and, ultimately, on uplink performance in a network level.

Alternatively, the distributed solution resides in the base station and is shown in FIG. 1f. For this purpose, RBS must exchange network performance data with its neighbour RBSs. Thus, each RBS may calculate its own network data, as would be done in the OSS in the centralised solution. In the subsequent description, unless stated otherwise, it is assumed that both implementations are identical.

Figure 2A:
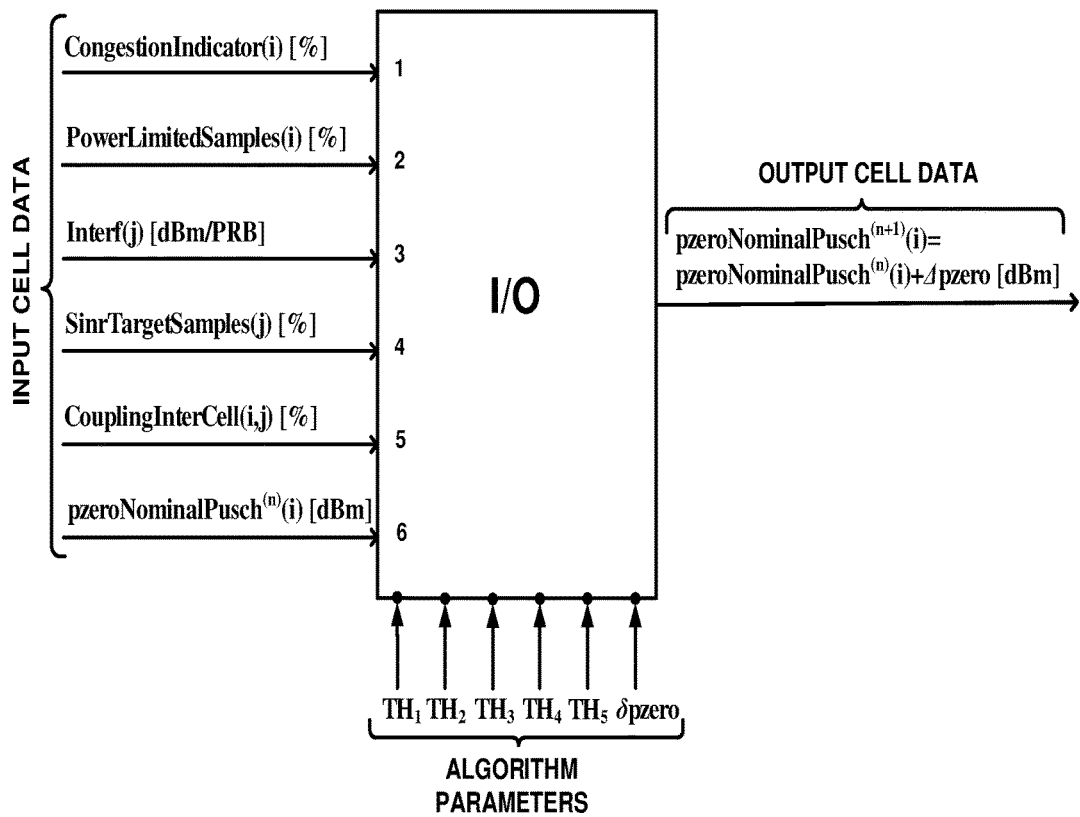
FIG. 2a is a block diagram of an exemplifying embodiment of the method.

FIG. 2a illustrates an example of the method as a 'blackbox', showing its inputs and output. As shown in the figure, the method has six cell performance indicators, whereof some or all may be considered when determining whether or not to increase $P_0$, pzeroNominalPusch. These indicators may be either directly provided as described above or other by network equipment or obtained after some calculations. In addition, five thresholds and a $P_0$ modification step, Δpzero, may also be set as described above. These thresholds and modification step are not considered as input data, but configuration parameters. System output is the change in pzeroNominalPusch (if required). Indicators and parameters are defined as follows, where (i) is the RBS for which congestion control is performed and (j) are individual neighbouring RBSs:

CongestionIndicator(i) [%] and, PowerLimitedSamples(i) [%] as described above. Interf(j) [dBm/PRB]: cell-level indicator showing 95%-tile of uplink interference per PRB in neighbour j for the period under analysis. A threshold value is defined for this parameter, $TH_3$. In this disclosure, a neighbour cell j is labelled as experiencing high interference when $Interf(j) > TH_3$. This indicator may be exchanged between neighbours in the distributed solution. SinrTargetSamples(j) [%] and CouplingInterCell(i,j) [%] as described above. δpzero: step in $P_0$ (when required). $\Delta pzero^{(n)}$ is δpzero if certain conditions are fulfilled, 0 otherwise. This variable may be computed in the OSS in the centralised solution, whereas, in the distributed solution, may be calculated in each RBS. pzeroNominalPusch$^{(n)}$(i), pzeroNominalPusch$^{(n+1)}$(i) [dBm]: the value of $P_0$ before and after iteration n. The method in this example is defined as an incremental controller, where $\Delta pzero^{(n)}$ is the parameter change in iteration n, i.e. pzeroNominalPusch$^{(n+1)}$(i)=pzeroNominalPusch$^{(n)}$(i)+$\Delta pzero^{(n)}$. The new value of the parameter may be calculated in each RBS in the distributed solution.

Figure 2B:
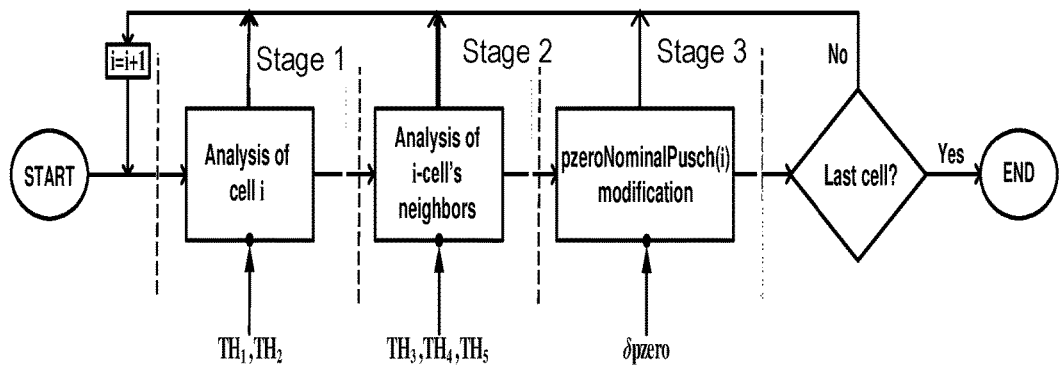
FIG. 2b is a flowchart of an exemplifying embodiment of the method.

The method comprises in this example an iterative process executed on a cell/RBS basis (i.e. the process is repeated for every cell/RBS in the centralised solution and in each RBS in the distributed solution). FIG. 2b illustrates an embodiment of the method by means of a flowchart. The analysis of a cell i comprises three stages. Stage 1 and 2 check if pzeroNominalPusch in cell/RBS i should be modified or not, by analysing the performance of cell i and its neighbours j, respectively. Stage 3 (if applicable) modifies pzeroNominalPusch in cell i. Along the different stages, the method may discard any modification of pzeroNominalPusch in cell i, so that the analysis of next cell/RBS i+1 starts. Different thresholds are used in different stages, as pointed out in the figure.

Figure 2C:
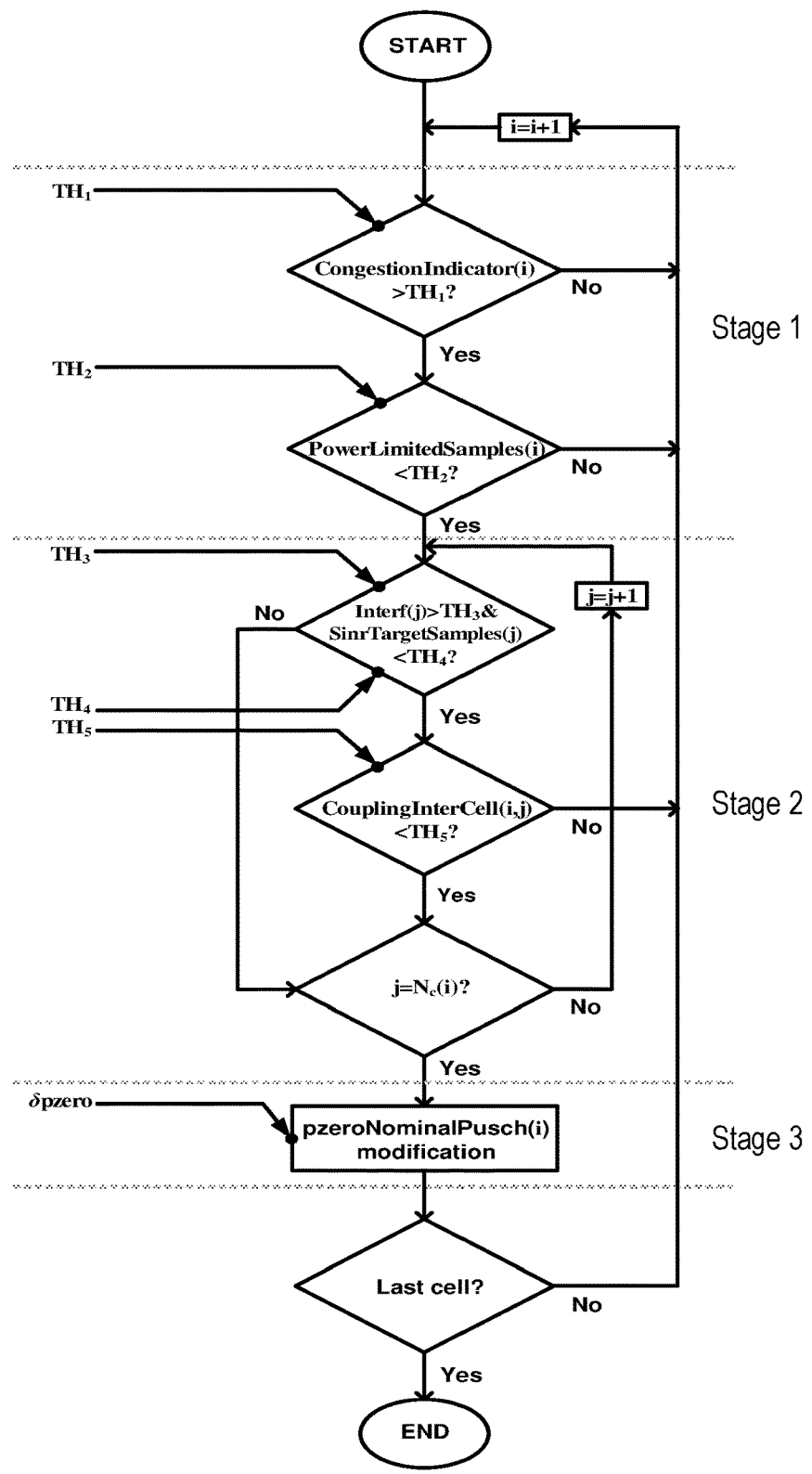
FIG. 2c is a flowchart of an exemplifying embodiment of the method.

A detailed description of the different stages is given in FIG. 2c. Stage 1 checks first if the cell/RBS under study is congested (CongestionIndicator(i)>$TH_1$), and, then, optionally, if cell/RBS i does not contain too many power-limited samples (PowerLimitedSamples(i)<$TH_2$). If any of the two conditions is not fulfilled, modifications in pzeroNominalPusch, $P_0$, are discarded and the analysis of a new cell/RBS starts.

Stage 2 aims to check if any neighbour cell/RBS experiences uplink interference problems first, and then if those interference problems come from the cell/RBS under study (cell i). For this purpose, stage 2 comprises an additional iterative process where all neighbour cells/RBSs of cell i are analysed. For every iteration, two different checks are implemented for every neighbour cell j∈{1, 2, . . . , $N_c$(i))} ($N_c$(i) is the number of neighbours of cell i). A first check tries to find out if cell/RBS j experiences interference problems. A neighbour cell/RBS is considered to have interference problems when a) Interf(j)>$TH_3$, and b) SinrTargetSamples(j) <$TH_4$. A second check aims to find out if interference problems in cell/RBS j are not originated by uplink transmissions in cell i (CouplingInterCell(i,j)<$TH_5$). In case cell/RBS j experiences uplink interference problems, and those problems are coming from uplink transmissions in cell i, any change in pzeroNominalPusch is discarded, and the analysis of a new cell starts.

Stage 3 implements pzeroNominalPusch increases for those cells/RBSs eligible to be modified. Increments may made by adding a step value as δpzero, pzeroNominalPusch$^{(n+1)}$(i)=pzeroNominalPusch$^{(n)}$(i)+δpzero.

Embodiments herein also relate to a network node for congestion control of an RBS. The network node has the same technical features, objects and advantages as the method performed by the network node. The network node will thus only be described in brief in order to avoid unnecessary repetition.

Figure 3:
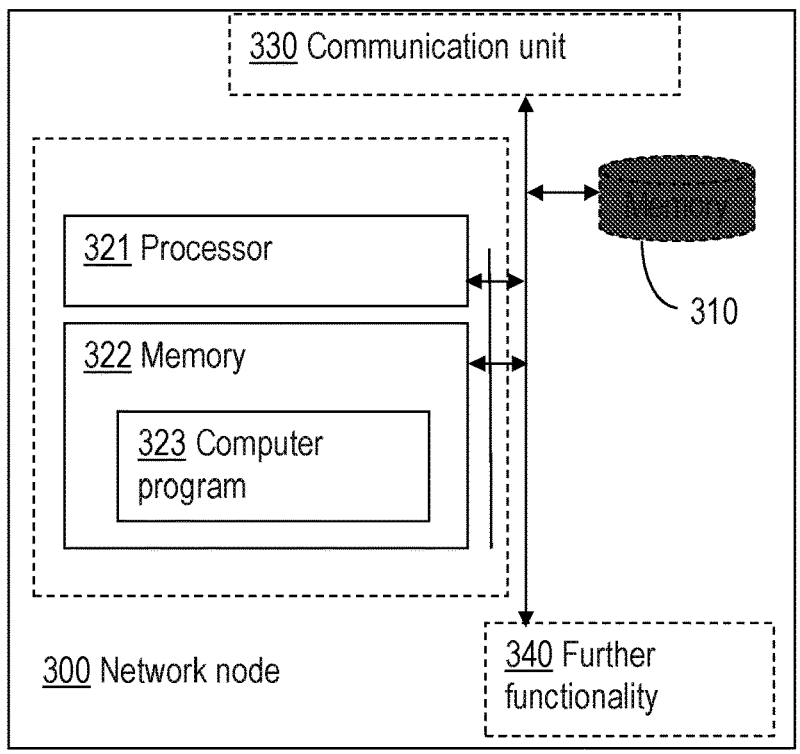
FIG. 3 is a block diagram of a network node for congestion control in an RBS, according to an exemplifying embodiment.

The network node will be described with reference to FIGS. 3 and 4. FIG. 3 and for illustrates the network node 300, 400 configured to determine that the RBS is congested; to determine an interference level in a neighbouring RBS caused by wireless devices currently being served by the RBS, or to determine a level of inter-cell coupling between the RBS and the neighbouring RBS. The network node 300, 400 is further configured to increase a value of an average received signal level target, $P_0$, for wireless devices currently being served by the RBS if the RBS is congested, if the determined interference level in the neighbouring RBS is below an interference threshold or if the level of inter-cell coupling is below a coupling threshold.

The network node 300, 400 may be implemented or realised in different ways.

FIG. 3 illustrates one exemplifying implementation or realisation of the network node 300. FIG. 3 illustrates the network node 300 comprising a processor 321 and memory 322, the memory comprising instructions, e.g. by means of a computer program 323, which when executed by the processor 321 causes the network node 300 to determine an interference level in a neighbouring RBS caused by wireless devices currently being served by the RBS, or to determine a level of inter-cell coupling between the RBS and the neighbouring RBS. The memory further comprises instructions, which when executed by the processor 321 causes the network node to increase a value of an average received signal level target, $P_0$, for wireless devices currently being served by the RBS if the RBS is congested, if the determined interference level in the neighbouring RBS is below an interference threshold or if the level of inter-cell coupling is below a coupling threshold.

FIG. 3 also illustrates the network node 300 comprising further functionality 340. The further functionality 340 may comprise hardware of software necessary for the network node 300 to perform different tasks that are not disclosed herein.

Figure 4:
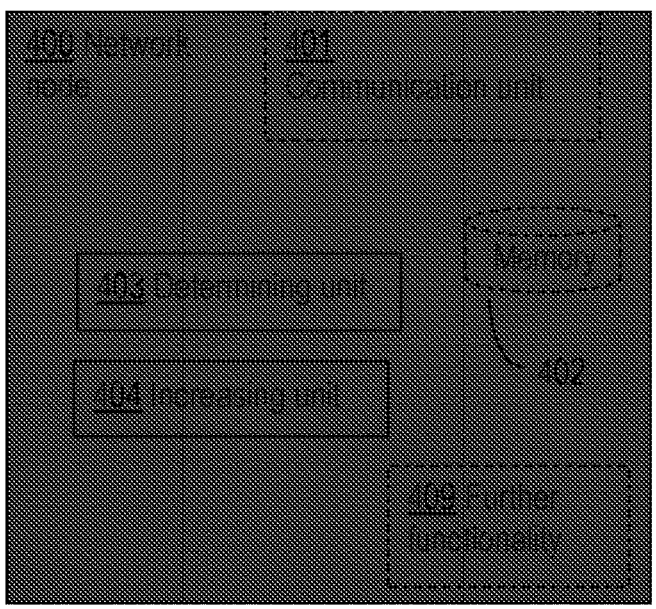
FIG. 4 is a block diagram of a network node for congestion control in an RBS, according to another exemplifying embodiment.

An alternative exemplifying implementation of the network node is illustrated in FIG. 4. FIG. 4 illustrates the network node 400 comprising a determining unit 403 for determining an interference level in a neighbouring RBS caused by wireless devices currently being served by the RBS, or for determining a level of inter-cell coupling between the RBS and the neighbouring RBS. The network node 400 further comprises an increasing unit 404 for increasing a value of an average received signal level target, $P_0$, for wireless devices currently being served by the RBS if the RBS is congested, if the determined interference level in the neighbouring RBS is below an interference threshold or if the level of inter-cell coupling is below a coupling threshold.

FIG. 4 also illustrates the network node 400 comprising further functionality 409. The further functionality 409 may comprise hardware of software necessary for the network node 400 to perform different tasks that are not disclosed herein.

The network node has the same possible advantages as the method performed by the network node. One possible advantage is that congestion problems may be solved in situations where all other congestion relief methods (e.g. HO-based or tilt-based load balancing) fail to work, e.g. indoor cells deployed for the underground, where limited cell overlapping exists and load patterns are highly correlated between adjacent cells. Another possible advantage is that the method may detect isolated cells, which are decoupled (from the interference point of view) from other cells in the network. Thus, increasing $P_0$ does not have a significant impact on interference in surrounding cells. Still a possible advantage is that the method may be triggered based on statistical cell measurements, which may be collected by RBSs. The changes of $P_0$ is reliable provided that a sufficiently long Report Output Period is selected for measurements (e.g. 1-2 days). Yet a further possible advantage is that the method is based on comparing key performance measurements against certain thresholds and it increases $P_0$ by a certain value (linear operation) when congestion is detected, thereby the computational load is low. A possible advantage is that the method does not need external parameters, wherein internal parameters, such as the thresholds, may be set based on field trials, thus making the method simple and easy to use. Further, an aim of the method is to detect congested cells that are isolated and increase their $P_0$ to reduce their traffic load. It is a straightforward method that is very easy to understand by network operators. Another possible advantage is that the method is applicable to heterogeneous (e.g. macro-indoor), multi-vendor and multi-RAT (Radio Access Technology) scenarios, since all the required information is available in all these cases.

According to an embodiment, the network node 300, 400 further is configured to determine both the interference level in a neighbouring RBS caused by wireless devices currently being served by the RBS and the level of inter-cell coupling between the RBS and the neighbouring RBS, wherein the network node is configured to increase the average received signal level target, $P_0$, if the determined interference level in the neighbouring RBS is below the interference threshold and if the level of inter-cell coupling is below the coupling threshold.

According to yet an embodiment, the network node 300, 400 further is configured to determine a received signal quality in the neighbouring RBS, wherein the average received signal level target, $P_0$, is increased, if also the received signal quality in the neighbouring RBS is above a signal quality threshold.

According to still an embodiment, the network node 300, 400 further is configured to determine a ratio of power limited samples received by the RBS from wireless devices currently being served by the RBS, wherein the average received signal level target, $P_0$, is increased, if also the ratio of power limited samples is below a power limiting threshold.

According to another embodiment, wherein determining that the RBS is congested comprises the network node 300, 400 being configured to compare a Congestion Indicator parameter against a congestion threshold, wherein the RBS is determined to be congested if the Congestion Indicator parameter is equal to or above the congestion threshold.

According to yet an embodiment, wherein determining the ratio of power limited samples comprises the network node 300, 400 being configured to determine a number of received transmissions, from wireless devices, having been transmitted at a limited transmission power, to determine a total number of received transmission samples from wireless devices, and to determine the ratio of power limited samples received by the RBS from wireless devices currently being served by the RBS by dividing the determined number of received transmissions, from wireless devices, having been transmitted at a limited transmission power by the determined total number of received transmission samples from wireless devices.

According to still an embodiment, wherein determining the interference level in a neighbouring RBS caused by wireless devices currently being served by the RBS comprises the network node 300, 400 being configured to receive a report from the neighbouring RBS indicating a percentage of average interference in the neighbouring RBS caused by wireless devices currently being served by the RBS, i.e. the RBS for which congestion control is being performed.

According to a further embodiment, the network node 300, 400 is configured to increase $P_0$ by adding a step value to the current $P_0$.

According to yet an embodiment, the network node 300, 400 is configured to determine an interference level in a neighbouring RBS caused by wireless devices currently being served by the RBS, for every neighbouring RBS of the RBS for which congestion control is being performed.

According to still an embodiment, the network node 300, 400 is a node implementing an OSS, or a node implementing an NMS.

According to another embodiment, the network node 300, 400 is the RBS for which congestion control is being performed.

According to yet another embodiment, the network node 300, 400 is a Radio Network Controller, RNC, or a Base Station Controller, BSC, controlling at least the RBS for which congestion control is being performed.

In FIG. 4, the network node 400 is also illustrated comprising a communication unit 401. Through this unit, the network node 400 is adapted to communicate with other nodes and/or entities in the wireless communication network. The communication unit 401 may comprise more than one receiving arrangement. For example, the communication unit 401 may be connected to both a wire and an antenna, by means of which the network node 400 is enabled to communicate with other nodes and/or entities in the wireless communication network. Similarly, the communication unit 401 may comprise more than one transmitting arrangement, which in turn may be connected to both a wire and an antenna, by means of which the network node 400 is enabled to communicate with other nodes and/or entities in the wireless communication network. The network node 400 further comprises a memory 402 for storing data. Further, the network node 400 may comprise a control or processing unit (not shown) which in turn is connected to the different units 403-404. It shall be pointed out that this is merely an illustrative example and the network node 400 may comprise more, less or other units or modules which execute the functions of the network node 400 in the same manner as the units illustrated in FIG. 4.

It should be noted that FIG. 4 merely illustrates various functional units in the network node 400 in a logical sense. The functions in practice may be implemented using any suitable software and hardware means/circuits etc. Thus, the embodiments are generally not limited to the shown structures of the network node 400 and the functional units. Hence, the previously described exemplary embodiments may be realised in many ways. For example, one embodiment includes a computer-readable medium having instructions stored thereon that are executable by the control or processing unit for executing the method steps in the network node 400. The instructions executable by the computing system and stored on the computer-readable medium perform the method steps of the network node 400 as set forth in the claims.

Figure 5:
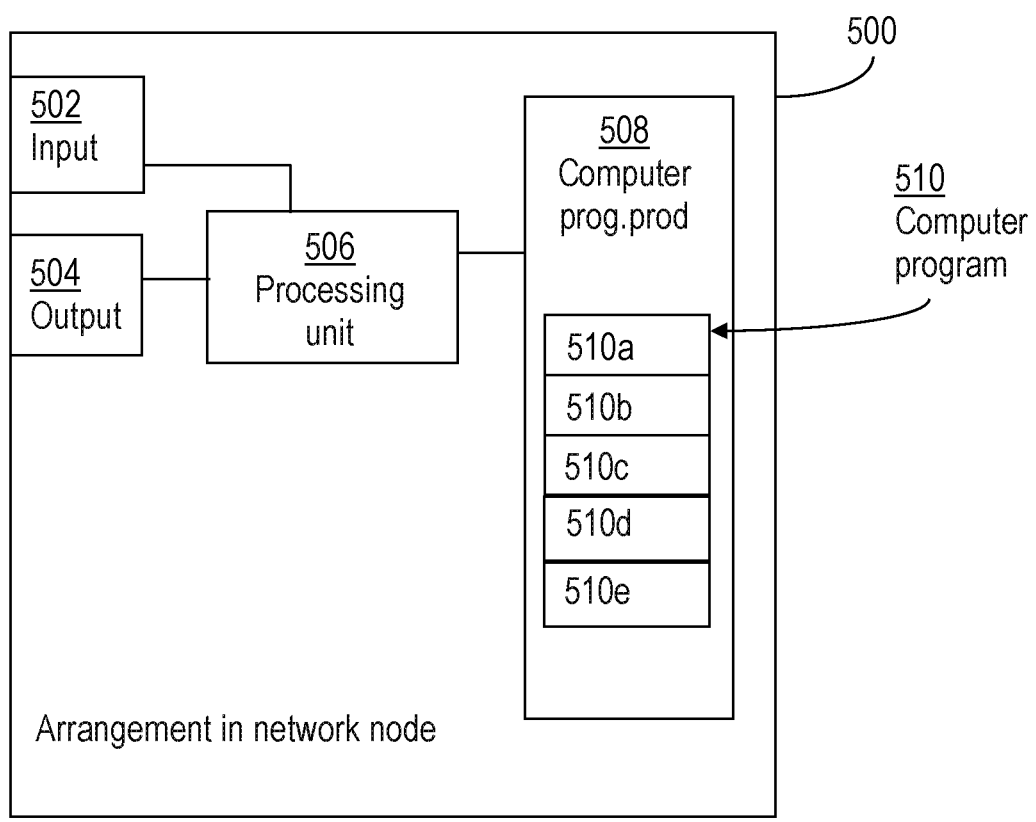
FIG. 5 is a block diagram of an arrangement in a network node for congestion control in an RBS, according to an exemplifying embodiment.

FIG. 5 schematically shows an embodiment of an arrangement 500 in a network node. Comprised in the arrangement 500 in the network node are here a processing unit 506, e.g. with a Digital Signal Processor, DSP. The processing unit 506 may be a single unit or a plurality of units to perform different actions of procedures described herein. The network node may also comprise an input unit 502 for receiving signals from other entities, and an output unit 504 for providing signal(s) to other entities. The input unit and the output unit may be arranged as an integrated entity or as illustrated in the example of FIG. 4, as one or more interfaces 401.

Furthermore, the arrangement in the network node comprises at least one computer program product 508 in the form of a non-volatile memory, e.g. an Electrically Erasable Programmable Read-Only Memory, EEPROM, a flash memory and a hard drive. The computer program product 508 comprises a computer program 510, which comprises code means, which when executed in the processing unit 506 in the arrangement in the network node causes the network node to perform the actions e.g. of the procedure described earlier in conjunction with FIGS. 1a-1c.

The computer program 510 may be configured as a computer program code structured in computer program modules 510a-510e. Hence, in an exemplifying embodiment, the code means in the computer program of the network node comprises a determining unit, or module, for determining; for determining that the RBS is congested; and determining an interference level in a neighbouring RBS caused by wireless devices currently being served by the RBS, or determining a level of inter-cell coupling between the RBS and the neighbouring RBS. The computer program further comprises an increasing unit, or module, for increasing a value of an average received signal level target, $P_O$, for wireless devices currently being served by the RBS if the RBS is congested, if the determined interference level in the neighbouring RBS is below an interference threshold or if the level of inter-cell coupling is below a coupling threshold The computer program modules could essentially perform the actions of the flow illustrated in FIGS. 1a-1c, to emulate the network node 400. In other words, when the different computer program modules are executed in the processing unit 506, they may correspond to the units 403-404 of FIG. 4.

Although the code means in the embodiments disclosed above in conjunction with FIG. 4 are implemented as computer program modules which when executed in the processing unit causes the network node to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the network node.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a network node for congestion control of a Radio Base Station, RBS, the method comprising:
   determining that the RBS is congested;
   determining:
      an interference level in a neighbouring RBS caused by wireless devices currently being served by the RBS; and
      a level of inter-cell coupling between the RBS and the neighbouring RBS; and
   increasing a value of an average received signal level target, $P_O$, for wireless devices currently being served by the RBS if:
      the RBS is congested;
      the determined interference level in the neighbouring RBS is below an interference threshold; and
      the level of inter-cell coupling is below a coupling threshold.

2. The method according to claim 1, further comprising determining a received signal quality in the neighbouring RBS, wherein the average received signal level target, $P_O$, is increased, if the received signal quality in the neighbouring RBS is also above a signal quality threshold.

3. The method according to claim 1, further comprising determining a ratio of power limited samples received by the RBS from wireless devices currently being served by the RBS, wherein the average received signal level target, $P_O$, is increased, if the ratio of power limited samples is also below a power limiting threshold.

4. The method according to claim 1, wherein determining that the RBS is congested comprises comparing a Congestion Indicator parameter against a congestion threshold, wherein the RBS is determined to be congested if the Congestion Indicator parameter is at least equal to the congestion threshold.

5. The method according to claim 1, wherein determining a ratio of power limited samples comprises determining a number of received transmissions, from wireless devices, having been transmitted at a limited transmission power, determining a total number of received transmission samples from wireless devices, and determining the ratio of power limited samples received by the RBS from wireless devices currently being served by the RBS by dividing the determined number of received transmissions, from wireless devices, having been transmitted at a limited transmission power by the determined total number of received transmission samples from wireless devices.

6. The method according to claim 1, wherein determining the interference level in a neighbouring RBS caused by wireless devices currently being served by the RBS comprises receiving a report from the neighbouring RBS indicating a percentage of average interference in the neighbouring RBS caused by wireless devices currently being served by the RBS.

7. The method according to claim 1, wherein increasing $P_0$ is performed by adding a step value to the current $P_0$.

8. The method according to claim 1, wherein determining an interference level in a neighbouring RBS caused by wireless devices currently being served by the RBS, is performed for every neighbouring RBS of the RBS for which congestion control is being performed.

9. A network node for congestion control of a Radio Base Station, RBS, the network node being configured to:
   determine that the RBS is congested;
   determine one of: an interference level in a neighbouring RBS caused by wireless devices currently being served by the RBS; and
   determining a level of inter-cell coupling between the RBS and the neighbouring RBS;
   increase a value of an average received signal level target, $P_0$, for wireless devices currently being served by the RBS if one of:
     the RBS is congested;
     if the determined interference level in the neighbouring RBS is below an interference threshold; and
     if the level of inter-cell coupling is below a coupling threshold; and
   determine a ratio of power limited samples received by the RBS from wireless devices currently being served by the RBS, wherein the average received signal level target, $P_0$, is increased, if the ratio of power limited samples is also below a power limiting threshold.

10. The network node according to claim 9, wherein the network node is configured to determine both the interference level in a neighbouring RBS caused by wireless devices currently being served by the RBS and the level of inter-cell coupling between the RBS and the neighbouring RBS, wherein the network node is configured to increase the average received signal level target, $P_0$, if the determined interference level in the neighbouring RBS is below the interference threshold and if the level of inter-cell coupling is below the coupling threshold.

11. The network node according to claim 9, further configured to determine a received signal quality in the neighbouring RBS, wherein the average received signal level target, $P_0$, is increased, if the received signal quality in the neighbouring RBS is also above a signal quality threshold.

12. The network node according to claim 9, further configured to determine a ratio of power limited samples received by the RBS from wireless devices currently being served by the RBS, wherein the average received signal level target, $P_0$, is increased, if the ratio of power limited samples is also below a power limiting threshold.

13. The network node according to claim 9, wherein determining that the RBS is congested comprises the network node being configured to compare a Congestion Indicator parameter against a congestion threshold, wherein the RBS is determined to be congested if the Congestion Indicator parameter is at least equal to the congestion threshold.

14. The network node according to claim 9, wherein determining a ratio of power limited samples comprises the network node being configured to determine a number of received transmissions, from wireless devices, having been transmitted at a limited transmission power, to determine a total number of received transmission samples from wireless devices, and to determine the ratio of power limited samples received by the RBS from wireless devices currently being served by the RBS by dividing the determined number of received transmissions, from wireless devices, having been transmitted at a limited transmission power by the determined total number of received transmission samples from wireless devices.

15. The network node according to claim 9, wherein determining the interference level in a neighbouring RBS caused by wireless devices currently being served by the RBS comprises the network node being configured to receive a report from the neighbouring RBS indicating a percentage of average interference in the neighbouring RBS caused by wireless devices currently being served by the RBS.

16. The network node according to claim 9, wherein the network node is configured to increase $P_0$ by adding a step value to the current $P_0$.

17. The network node according to claim 9, wherein the network node is configured to determine an interference level in a neighbouring RBS caused by wireless devices currently being served by the RBS, for every neighbouring RBS of the RBS for which congestion control is being performed.

18. A non-transitory computer readable medium storing compute executable code which when, run in a processing unit of a network node, causes the network node to perform a method for congestion control of a Radio Base Station, RBS, the method comprising:
   determining that the RBS is congested;
   determining one of:
     an interference level in a neighbouring RBS caused by wireless devices currently being served by the RBS; and
     a level of inter-cell coupling between the RBS and the neighbouring RBS; and
   increasing a value of an average received signal level target, $P_0$, for wireless devices currently being served by the RBS if one of:
     the RBS is congested;
     if the determined interference level in the neighbouring RBS is below an interference threshold; and
     if the level of inter-cell coupling is below a coupling threshold; and
   determining a ratio of power limited samples received by the RBS from wireless devices currently being served by the RBS, wherein the average received signal level target, $P_0$, is increased, if the ratio of power limited samples is also below a power limiting threshold.

* * * * *